United States Patent [19]

Seha

[11] 4,044,030
[45] Aug. 23, 1977

[54] PROCESS FOR THE MANUFACTURE OF N-ALKYLAMINO- AND N,N-DIALKYLAMINOANTHRAQUINONES

[75] Inventor: Zdenek Seha, Basel, Switzerland

[73] Assignee: Ciba-Geigy Corporation, Ardsley, N.Y.

[21] Appl. No.: 688,517

[22] Filed: May 20, 1976

[30] Foreign Application Priority Data

May 23, 1975 Switzerland .................... 6665/75

[51] Int. Cl.$^2$ ........................ C09B 1/16; C09B 1/20
[52] U.S. Cl. .................................... 260/378; 260/382
[58] Field of Search ............................ 260/378, 382

[56] References Cited

U.S. PATENT DOCUMENTS

| | | | |
|---|---|---|---|
| 3,812,137 | 5/1974 | Rauch et al. | 260/378 X |
| 3,907,838 | 9/1975 | Thiem et al. | 260/378 |

FOREIGN PATENT DOCUMENTS 2,211,411  9/1972  Germany ............... 260/378 UX

OTHER PUBLICATIONS

"Ullmans Encyklopadie der Technischen Chemie", 4th. Ed.; 7, p. 591, Weinheim (1973).

*Primary Examiner*—Paul F. Shaver
*Attorney, Agent, or Firm*—Karl F. Jorda; Edward McC. Roberts; Prabodh I. Almaula

[57] ABSTRACT

A process for the manufacture of N-alkylamino- and N,N-dialkylaminoanthraquinone from the corresponding nitroanthraquinones, which comprises reacting substituted or unsubstituted nitroanthraquinones or dinitroanthraquinones with at least twice the molar amount, referred to the nitro groups to be reacted, of an alkyl acid amide, at temperatures between 100° C and the boiling point of the alkyl acid amide.

6 Claims, No Drawings

PROCESS FOR THE MANUFACTURE OF N-ALKYLAMINO- AND N,N-DIALKYLAMINOANTHRAQUINONES

The present invention provides a process for the manufacture of N-alkylamino- and N,N-dialkylaminoanthraquinones from the corresponding nitroanthraquinones, which process comprises reacting substituted or unsubstitued nitroanthraquinones or dinitroanthraquinones with at least twice the molar amount, referred to the nitro groups to be reacted, of an alkyl acid amide which is simultaneously reactant and reaction medium, at temperatures between 100° C and the boiling point of the alkyl acid amide.

The reaction takes place according to the general reaction equation

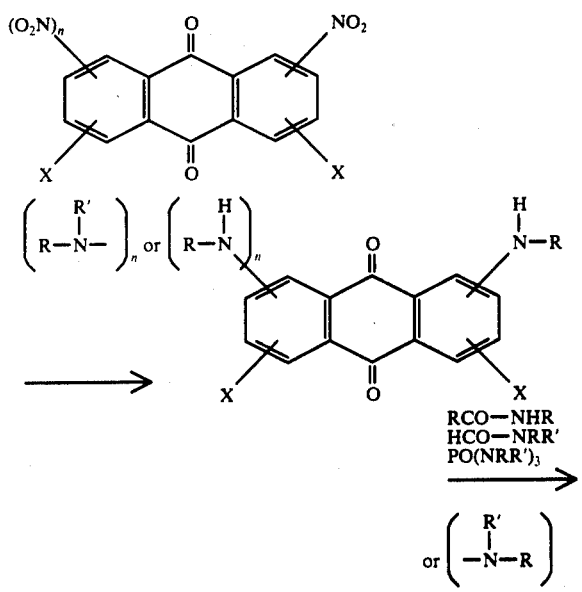

wherein
R and R', which are the same or different, represent alkyl, aralkyl, cycloalkyl or hydroxyalkyl radicals of 1 to 8 carbon atoms,
$n$ is 0 or 1,
X represents a functional substituent, for example the carboxyl, sulpho, hydroxy, amino or halogen group, which can be attached direct or through a bridge member to the anthraquinone nucleus.

The reaction can be carried out with mononitroanthraquinones and/or dinitroanthraquinones.

The aminoanthraquinones obtained by the process of this invention are known and are useful dyes or dyestuff intermediates.

The aminolysis of nitroanthraquinones is described in German Pat. Nos. 136.777, 136.778 and 144.634. However, polar solvents, such as water, alcohols or pyridine, are used as reaction media therein.

The use of polar solvents as reaction media results in only very poor yields and lengthy reaction times are required. For example, the reaction of 1-nitroanthraquinone with a 300% excess of isopropylamine at 75° C after 100 hours gives a yield of only 70% of 1-isopropylaminoanthraquinone.

Swiss Pat. application No. 12793/74 describes the aminolysis by reacting nitroanthraquinones with organic amines using dipolar aprotic solvents which contain $-SO_2$ or $-SO$ groups as reaction media. This process is satisfactory up to the recovery of the solvents used as reaction medium, which may have to be separated by distillation from the amines used as reactants.

By comparison, N-alkylamino- and N,N-dialkylamino-anthraquinones are obtained surprisingly in very high and often even quantitative yields by the process of this invention. The products are obtained in a high degree of purity, so that mostly they do not need to be purified any more. The reaction conditions are simple and the reaction course is easily kept under control. No problems regarding corrosion or of a technical nature arise in respect of the apparatus used and the recovery of the excess acid amide used as reaction medium presents no difficulties. The reaction course is uniform and virtually no residues occur, so that the process of this invention also marks a considerable advance especially from the ecological standpoint.

The excess acid amide can be almost completely recovered after the reaction by simple distillation or by filtering it off from the product, and reused for a fresh batch.

Examples of aminoanthraquinones which can be obtained by the process of this invention are:
1-isopropylaminoanthraquinone, 1-isobutylamino-2-methylanthraquinone, 1-methylaminoanthraquinone, 1-diethylaminoanthraquinone, 1-cyclohexylaminoanthraquinone, the sodium salt of 1-isopropylaminoanthraquinone-6/7-sulphonic acid, 1-isobutylaminoanthraquinone, 1-diisopropyl-, 1-diisobutyl- and 1-dicyclohexylaminoanthraquinone, 1-isopropylamino-2-methylanthraquinone 1-cyclohexylamino-2-methylanthraquinone, 1,5-bis-methylaminoanthraquinone and 1-dimethylaminoanthraquinone.

The aminolysis is carried out in conventional reaction vessels or autoclaves. A suitable apparatus is the rotary evaporator or, for batches produced on an industrial scale, the paddle drier (Venulett). The reaction temperature will be at least 100° C. The preferred reaction temperature is between 160° and 200° C. The aminolysis can be carried out both under pressure and without pressure. It is preferred to operate without pressure. The reaction time is from 0.5 to 15 hours, preferably 1 to 5 hours.

The weight ratio of the acid amide as reactant and reaction medium to the nitroanthraquinone is advantageously between 4:1 to 10:1.

Suitable acid amides are those of the formulae HCONHR, RCONHR, HCONRR', RCONNRR' or those of the formulae $PO(-NRR')_3$, $SO_2(-NRR')_2$ or $SO(-NRR')_2$, wherein R and R', which are the same or different, represent alkyl, aralkyl, cycloalkyl or hydroxyalkyl radicals of 1 to 8 carbon atoms.

An alkyl group represented by each of R and R' can be the same or different, straight-chain or branched, and is in particular a low molecular alkyl group of 1 to 4 carbon atoms, such as methyl, ethyl, propyl, isopropyl, tert.butyl, or a long-chain alkyl group, such as hexyl or octyl. A cycloalkyl group represented by each of R and R' is in particular the cyclohexyl group and an aralkyl group represented by R and R' is above all the benzyl or phenethyl group. Preferably each of R and R' represents a lower alkyl group.

Examples of acid amides which can be used according to the invention are:
N-methyl formamide, N-methyl acetamide, N,N-dimethyl formamide, N-ethyl formamide and hexamethylphosphoric triamide or tetramethyl thionyl diamide.

The reaction is carried out, for example, in such a way that the reactants, nitroanthraquinone and acid amide, are charged into a reaction vessel and stirred for several hours at temperatures between 100° and 200° C. When the reaction is complete, the excess acid amide is distilled off and can be reused. In many cases the product crystallises out after the reaction mixture has cooled, so that it is separated by filtration, and the mother liquor (i.e., excess acid amide with a small amount of dissolved product) can be reused for further reactions. It will be readily understood that the products can also be isolated by diluting the reaction mixture with water or alcohols and subsequent filtration.

The following Examples illustrate the process of the present invention without implying any restriction to what is described therein. The parts are by weight.

EXAMPLE 1

25.3 parts of 1-nitroanthraquinone and 227 parts of N-methyl formamide are heated in a rotary evaporator flask to 180° C, in the process of which nitrous gases and carbon monoxide are liberated. The reaction is complete after 5 hours. Excess N-methyl formamide is then distilled off. The 212 parts of recovered N-methyl formamide can be reused. After distillation, 23.4 parts (=98.7% of theory) of pure 1-methylaminoanthraquinone are obtained as residue.

EXAMPLE 2

25.3 parts of 1-nitroanthraquinone and 227 parts of hexamethylphosphoric triamide are heated in an agitator flask for 4 hours to 180° C and for 1½ hours to 210° C. After it has been cooled, the reaction mixture is poured into 1000 parts of water. The precipitated product is collected by filtration, washed with water and dried, to yield 23.2 parts (=92.4% of theory) of 1-dimethylaminoanthraquinone.

EXAMPLE 3

29.8 parts of 1,5-dinitroanthraquinone and 170 parts of N-methyl formamide are heated with stirring for 3 hours to 185° C. The reaction mixture is then cooled and poured into 750 parts of water. The precipitated product is collected by filtration, washed with water and dried, to yield 25.6 parts (=96.1% of theory) of 1,5-bis-methylaminoanthraquinone.

EXAMPLE 4

8.95 parts of 1,8-dinitroanthraquinone and 80 parts of N-methyl formamide are heated with stirring for 3 hours to 185° C. After the reaction mixture has been cooled, the product crystallises out and is collected by filtration. The mother liquor is used for a subsequent batch. The filter product is washed with 30 parts of methanol and the filtrate kept for regeneration. This procedure is repeated twice with the same methanol used for washing. After the third time, methanol and N-methyl formamide are distilled off from the mother liquor, whereupon further product is obtained. In this way a total yield of 22.6 parts (3 fractions and distillation residue) of 1,8-bis-methylaminoanthraquinone (=94.3% of theory) are obtained.

I claim:

1. A process for the manufacture of N-alkylamino- and N,N-dialkylaminoanthraquinone from the corresponding nitroanthraquinones, which comprises reacting substituted or unsubstituted nitroanthraquinones or dinitroanthraquinones with at least twice the molar amount, referred to the nitro groups to be reacted, of an alkyl acid amide, at temperatures between 100° C and the boiling point of the alkyl acid amide.

2. A process according to claim 1, which comprises the use of acid amides of the formulae HCONHR, RCONHR, HCONRR', RCONRR', PO(—NRR')$_3$, SO(—NRR')$_2$ and SO$_2$(—NRR')$_2$, wherein each of R and R', which are the same or different, represents alkyl, aralkyl, cycloalkyl or hydroxyalkyl radicals of 1 to 8 carbon atoms.

3. A process according to claim 1, wherein the reaction is carried out at temperatures between 160° and 200° C.

4. A process according to claim 1, which comprises the use of compounds of the formula I or II

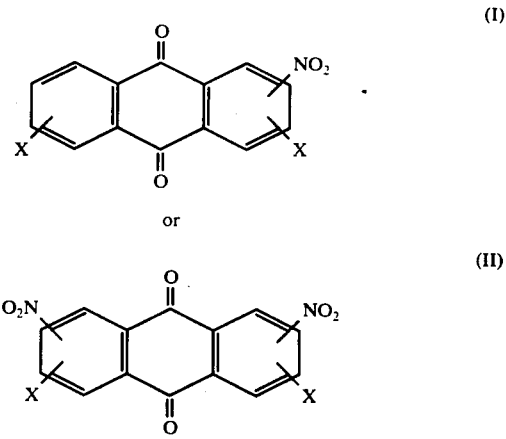

wherein X represents hydrogen, halogen or the carboxyl, sulpho, hydroxy or amino group, which can be attached direct or through a bridge member to the anthraquinone nucleus.

5. A process according to claim 1, which comprises the use of nitroanthraquinones or dinitroanthraquinones of the formula I or II, wherein X represents hydrogen.

6. A process according to claim 1, wherein the weight ratio of acid amide to nitroanthraquinone is 4:1 to 10:1.

* * * * *